United States Patent
Frost et al.

(10) Patent No.: US 9,102,410 B2
(45) Date of Patent: Aug. 11, 2015

(54) VERTICALLY STOWED TRAY TABLE ASSEMBLY WITH TRANSLATIONAL MOVEMENT

(71) Applicant: B/E AEROSPACE, INC., Wellington, FL (US)

(72) Inventors: Ian Lawrence Frost, Tucson, AZ (US); Kristopher Charles Moulton, Tucson, AZ (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/245,300

(22) Filed: Apr. 4, 2014

(65) Prior Publication Data

US 2014/0300148 A1     Oct. 9, 2014

Related U.S. Application Data

(60) Provisional application No. 61/808,348, filed on Apr. 4, 2013.

(51) Int. Cl.
*A47B 39/00*     (2006.01)
*B64D 11/06*     (2006.01)
*B60N 3/00*      (2006.01)
*B60N 2/24*      (2006.01)

(52) U.S. Cl.
CPC ........... *B64D 11/06* (2013.01); *B60N 2/242* (2013.01); *B60N 3/002* (2013.01); *B64D 11/0638* (2013.01)

(58) Field of Classification Search
CPC ........... A47C 7/70; A47B 83/02; B64D 11/06
USPC ......... 297/173, 145, 150, 155, 160, 154, 149; 108/7
See application file for complete search history.

(56) References Cited

U.S. PATENT DOCUMENTS

| | | | | |
|---|---|---|---|---|
| 1,231,678 | A | * | 7/1917 | Walker .................... 108/49 |
| 1,465,291 | A | * | 8/1923 | Walker .................... 297/150 |
| 2,518,381 | A | * | 8/1950 | Runkles .................. 297/145 |
| 3,060,624 | A | * | 10/1962 | Wenger ................... 108/7 |
| 3,353,866 | A | * | 11/1967 | Chapman et al. ....... 297/162 |
| 3,583,760 | A | * | 6/1971 | McGregor ............... 297/145 |
| 3,632,161 | A | * | 1/1972 | Arfaras et al. .......... 297/145 |
| 4,397,245 | A | * | 8/1983 | Washburn ................ 108/7 |
| 4,834,449 | A | * | 5/1989 | Engelman ............... 297/145 |

(Continued)

FOREIGN PATENT DOCUMENTS

| | | |
|---|---|---|
| EP | 1 449 709 A1 | 8/2004 |
| WO | 2013030797 A1 | 3/2013 |

OTHER PUBLICATIONS

International Search Report dated Jul. 28, 2014 for International Application No. PCT/US2014/032963.

*Primary Examiner* — Jose V Chen
(74) *Attorney, Agent, or Firm* — Shumaker, Loop & Kendrick, LLP (57) ABSTRACT

A tray table assembly for a passenger seat including a horizontal rail arranged alongside the seat, the horizontal rail having a length extending from the seatback to a position forward of the seat, a carriage assembly configured to travel horizontally along the rail, and a tray table attached to the carriage assembly, the tray table configured to pivot between a vertical orientation in which the tray table is stowed alongside the seatback and a horizontal orientation in which the tray table is positioned forward of the seatback.

12 Claims, 11 Drawing Sheets

(56) References Cited

U.S. PATENT DOCUMENTS

| | | | |
|---|---|---|---|
| 5,129,702 A * | 7/1992 | Ervin | 297/144 |
| 5,131,333 A * | 7/1992 | Karasawa et al. | 108/7 |
| 5,197,393 A * | 3/1993 | Yeakle | 108/10 |
| 6,347,590 B1 * | 2/2002 | D'Annunzio et al. | 108/44 |
| 6,375,259 B1 * | 4/2002 | Ma | 297/217.3 |
| 7,874,614 B2 * | 1/2011 | Figueras Mitjans | 297/145 |
| 8,028,630 B2 | 10/2011 | Merensky | |
| 8,256,835 B2 * | 9/2012 | Brink et al. | 297/162 |
| 8,813,657 B2 * | 8/2014 | Winter et al. | 108/44 |
| 2009/0050740 A1 | 2/2009 | Saint-Jalmes et al. | |
| 2010/0231009 A1 * | 9/2010 | Chi | 297/155 |
| 2013/0076082 A1 * | 3/2013 | Herault | 297/173 |

\* cited by examiner

VERTICALLY STOWED TRAY TABLE ASSEMBLY WITH TRANSLATIONAL MOVEMENT

CROSS-REFERENCE TO RELATED APPLICATION

This application claims priority from U.S. Application No. 61/808,348 filed Apr. 4, 2013, the entirety of which is incorporated by reference herein.

TECHNICAL FIELD AND BACKGROUND OF THE INVENTION

The present invention relates generally to the field of tray table assemblies associated with passenger seats, and more particularly, to a tray table configured to slide along a rail adjacent a seat and move between a stowed vertical orientation alongside a seatback and a deployed horizontal position forward of the seatback.

Tray tables are associated with most every type and class of aircraft seat to provide a passenger with a flat, horizontal tabletop for working, dining, etc. Tray tables are typically configured to move between a stowed position when not in use, such as during taxi, takeoff and landing, and a deployed position for use during flight. In coach class seating, tray tables are often attached to the back of a forward seat and pivot downward to horizontal for use by a passenger in the next row. In seating arrangements in which there are no forward seats, tray tables commonly stow within a vertical pocket alongside the seat, and thus require complex hinge assemblies and armatures to lift, pivot and rotate the tabletop into place over the passenger's lap.

In either of the aforementioned seating arrangements, conventional tray tables are typically required to be stowed to permit ingress/egress from the seat. Stowing the tray table requires changing the horizontal orientation of the tabletop, which requires the passenger to remove their articles beforehand. This is particularly inconvenient when the passenger intends on only briefly getting up, for example, to use the lavatory, or when the tabletop is supporting food and beverages that are difficult to store elsewhere. Tray tables that store alongside the seat within a vertical pocket are also disadvantageous in that a storage compartment adds complexity and weight, and consumes valuable floor and seat space.

Accordingly, what is needed is a tray table configured to move when deployed to permit egress without having to be stowed, as well as a tray table that stows within space not presently utilized for another purpose. Such a tray table would enhance passenger comfort and convenience and maximize the use of limited space in the aircraft cabin.

BRIEF SUMMARY OF THE INVENTION

In a first embodiment, provided herein is a tray table assembly for a passenger seat including a seatback and a seat bottom. The tray table assembly generally includes a horizontal rail arranged alongside the passenger seat having a length extending from the seatback to a position forward of the seat, a carriage assembly configured to travel horizontally along the length of the horizontal rail, and a tray table attached to the carriage assembly, the tray table configured to pivot between a vertical orientation in which the tray table is stowed alongside the seatback and a horizontal orientation in which the tray table is positioned forward of the seatback.

In a further embodiment, the tray table assembly may include a second horizontal rail arranged parallel to and continuous with the horizontal rail, the carriage assembly configured to travel simultaneously along both rails.

In a further embodiment, the tray table assembly may include a ledge arranged parallel to and vertically below the horizontal rail, the ledge continuous along a portion of the length of the horizontal rail such that the ledge interferes with the carriage assembly to prevent the carriage assembly from lowering until the carriage assembly is forward and clear of the ledge.

In a further embodiment, the tray table assembly may include a housing within which the horizontal rails and the ledge are housed.

In a further embodiment, the carriage assembly may include one of a linear-motion bearing, a rolling element bearing, a roller slide, a plain bearing and a roller for sliding movement along the length of the horizontal rail.

In a further embodiment, the tray table assembly may include a support member and a support beam, the support member pivotally attached to the carriage assembly and the support beam, the support beam supporting the tray table in a horizontal cantilevered orientation, and the support beam configured to slide vertically along the carriage assembly such that as the tray table pivots toward horizontal the support beam lowers vertically and pivots to an angle to vertical.

In a further embodiment, the carriage assembly may include a gas spring arranged to provide a spring force for lifting the tray table for stowing, and the gas spring may be sized such that the spring force cancels out force from the tray table's center of gravity when the tray table is at 45 degrees to horizontal.

In a further embodiment, the tray table assembly may include a damper arranged to control tray table rotation during deployment.

According to a second embodiment of the invention, an aircraft passenger seat is provided herein including a seat bottom and a seatback, and a tray table assembly arranged alongside the seat. The tray table assembly includes a horizontal rail arranged alongside the passenger seat having a length extending from the seatback to a position forward of the seat, a carriage assembly configured to travel horizontally along the length of the horizontal rail, and a tray table pivotally attached to the carriage assembly configured to pivot between a vertical orientation in which the tray table is stowed alongside the seatback and a horizontal orientation in which the tray table is positioned forward of the seatback.

In a further embodiment, the tray table assembly may include a second horizontal rail arranged parallel to and continuous with the first horizontal rail, the carriage assembly configured to travel simultaneously along both rails.

In a further embodiment, the tray table assembly may include a ledge arranged parallel to and vertically below the horizontal rail, the ledge continuous along a portion of the length of the horizontal rail such that the ledge interferes with the carriage assembly to prevent the carriage assembly from lowering until the carriage assembly is forward and clear of the ledge.

In a further embodiment, the tray table assembly may include a housing positioned alongside the seat within which the horizontal rails and the ledge are housed.

In a further embodiment, the tray table assembly may include a support member and a support beam, the support member pivotally attached to the carriage assembly and the support beam, the support beam supporting the tray table in a horizontal cantilevered orientation, and the support beam configured to slide vertically along the carriage assembly such that as the tray table pivots toward horizontal the support beam lowers vertically and pivots to an angle to vertical.

In a further embodiment, the tray table assembly may include a gas spring arranged to provide a spring force for lifting the tray table for stowing, and a damper arranged to control tray table rotation during deployment.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to FIGS. 1-6, a tray table assembly according to an embodiment of the invention is shown generally at reference numeral 20. The tray table assembly 20 is shown arranged alongside an aircraft seat 22 for use by a seated passenger. The seat 22 can be any type of seat, for example, a coach class seat limited to a shallow recline or a premium class seat configured to move between upright and lie flat sitting positions. The seat 22 generally includes a seatback 24, seat bottom 26, a legrest 28 and armrests 30, each of which may move independently or cooperatively to achieve various sitting positions. The seat 22 may be part of a row of laterally adjacent seats, a group of nested seats and/or suites, or an isolated seat, among other seat types. As shown, a partition or privacy shell 32 is positioned behind the seat 22. The tray table assembly 20 is positioned alongside the seat 22, aligned substantially parallel to the longitudinal axis of the seat. The entire tray table assembly 20 has a length about equal to or longer than the seat 22 such that the tray table 34 can travel horizontally from a stowed position alongside or slightly behind the seat back 24 to a deployed horizontal position forward of the seat 22, as described in detail below.

Figure 1:
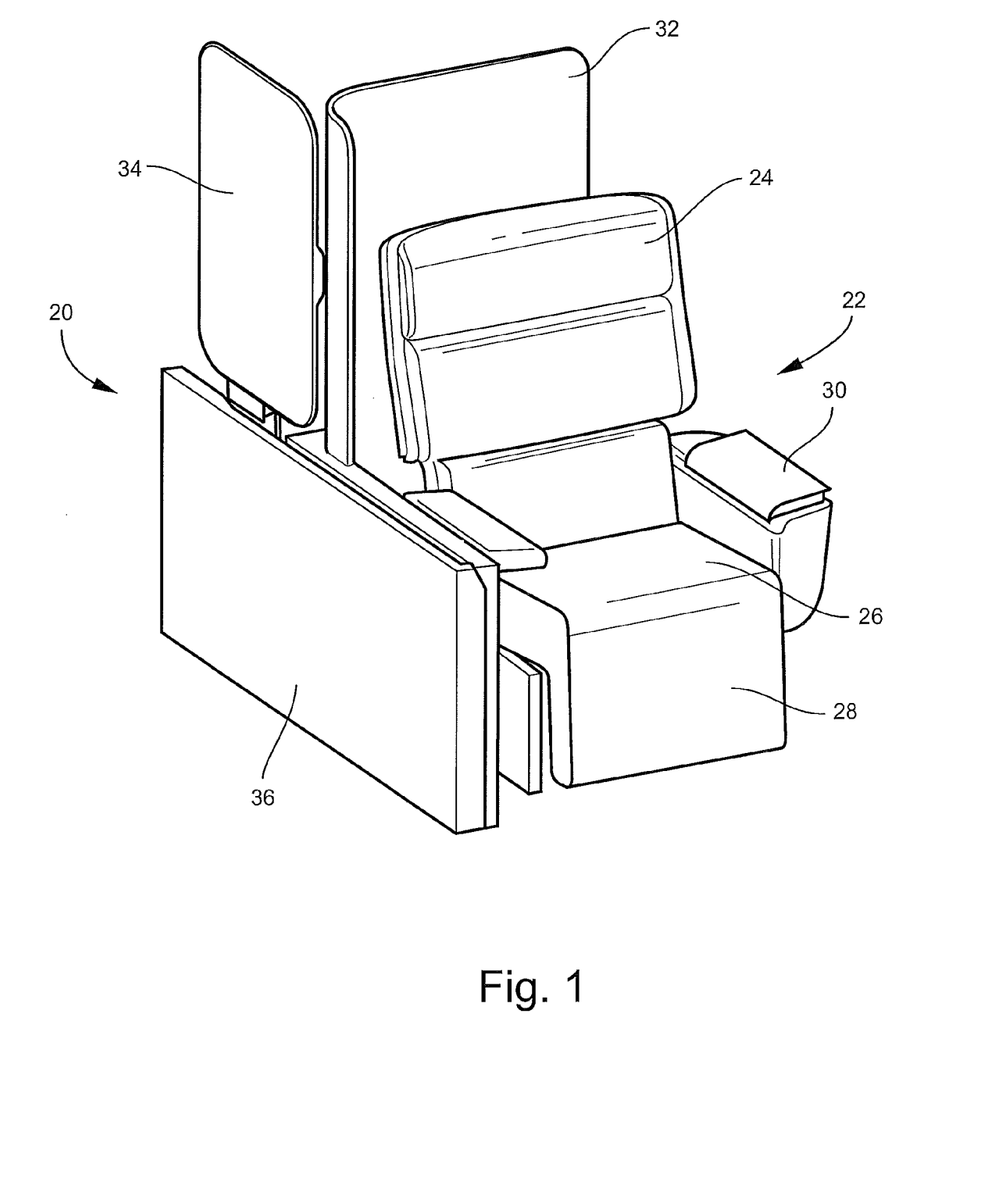
FIG. 1 is an isometric view of a tray table assembly according to an embodiment of the invention associated with an aircraft passenger seat.
Figure 2:
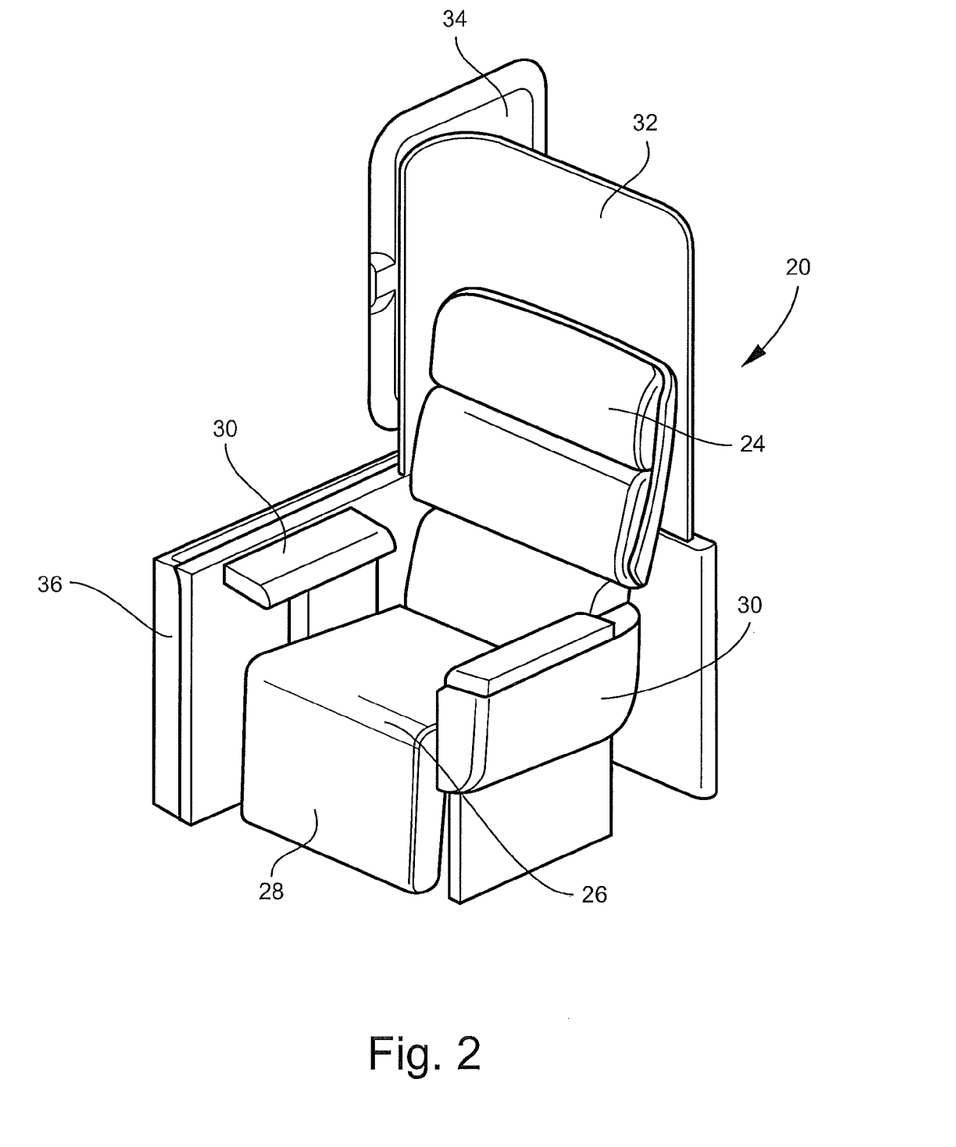
FIG. 2 is another isometric view of the tray table assembly and associated seat showing the tray table stowed vertically alongside the seatback.

As shown in FIGS. 1 and 2, the tray table 34 is configured to stow vertically, or substantially vertically, alongside the seatback 24 at a height vertically above the armrest 30. In the stowed position, the tray table 34 occupies the space between the seatback 24 and the interior wall of the aircraft, or the space between adjacent seatbacks, neither of which have been utilized for tray table storage prior to the present invention. Space permitting, the tray table 34 may be vertical when fully stowed alongside the seatback 24. In seating arrangements in which the curvature of the interior wall and the length of the tray table 34 do not allow the tray table to be stowed vertically, the tray table may be stowed at a slight angle to vertical. The tray table 34 may optionally lean against the interior wall or seatback 24 when fully stowed. The tray table assembly 20 may be secured to and supported by one or more of the interior wall of the aircraft, the seat frame and the privacy shell 32.

The tray table assembly 20 generally includes the tray table 34, a housing 36 housing at least one horizontal rail, and a carriage assembly 44 for moving the tray table along the rail, as described in detail below. The housing 36 may be stationary or configured to travel (e.g., slide) horizontally alongside the seat 22. The carriage assembly 44 is configured to travel horizontally (e.g., slide) along the length of the horizontal rail and rotate the tray table 34 between vertical and horizontal. Thus, the housing 36 may translate forward and rearward relative to the seat 22, and the carriage assembly translates relative to the housing 36, carrying the tray table 34 along therewith. The length of travel of the housing 36 and/or carriage assembly 44 may depend on one or more seat length, the extent of seat recline, and the amount of available space forward and rearward of the seat 22, among other factors. The housing length and shape may be customized based on the installation location, the shape of the interior wall, the amount of available space between the seat and the interior wall, the amount of space between seats, the seat type and frame, etc.

Figure 3:
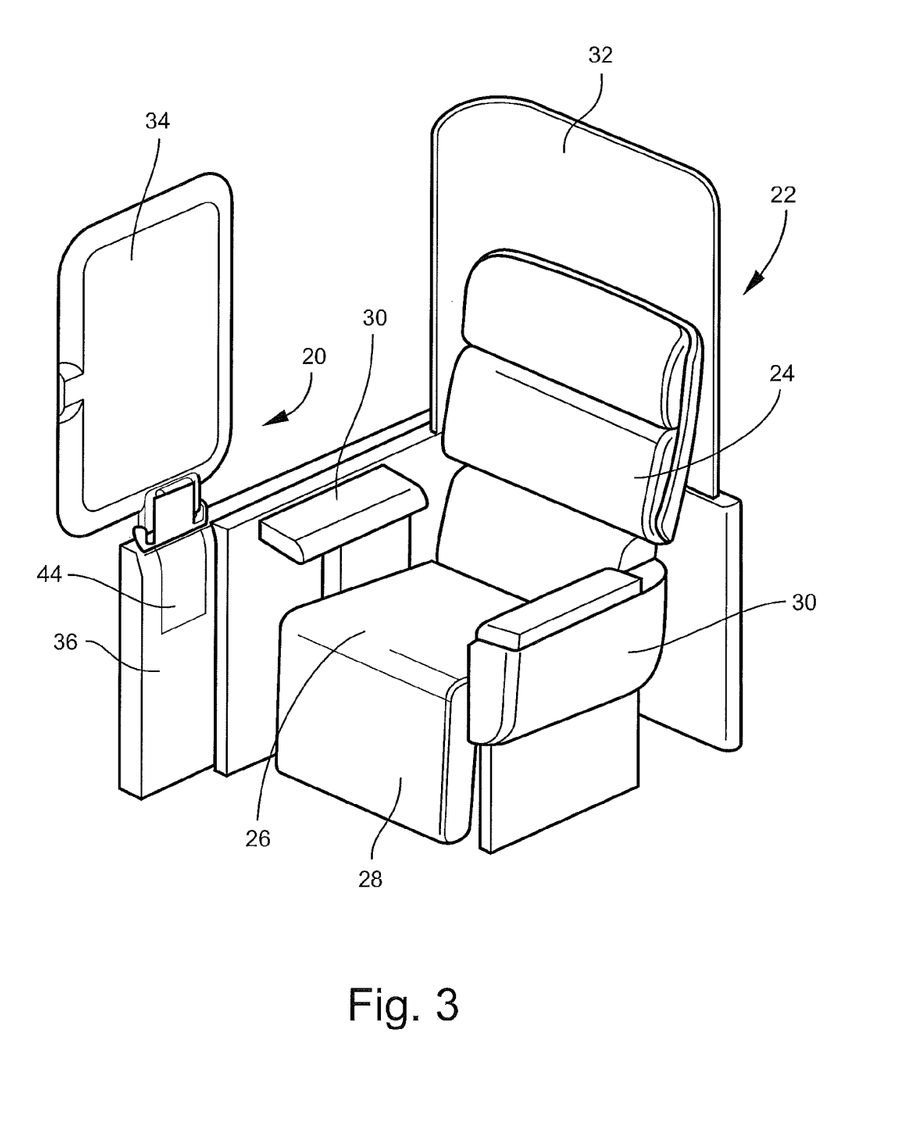
FIG. 3 shows the tray table slid forward along the rail and in a vertical orientation.
Figure 4:
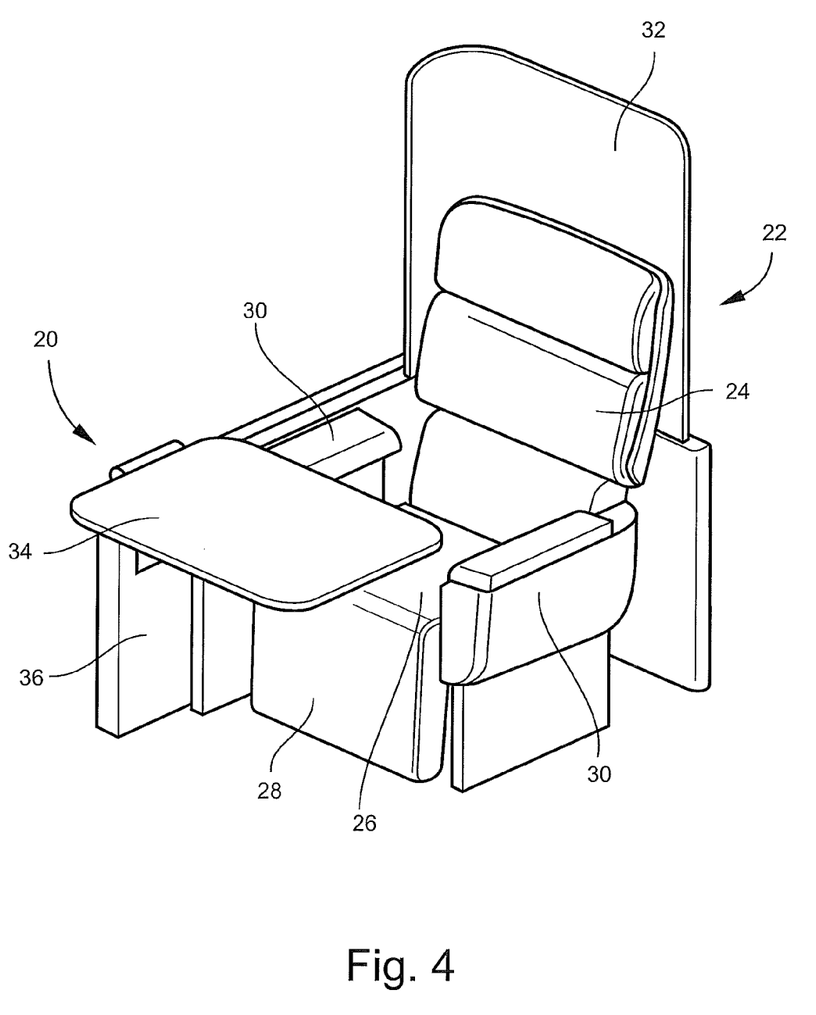
FIG. 4 shows the tray table deployed horizontally.

Referring to FIGS. 3 and 4, the tray table 34 is deployed by sliding the tray table and/or housing 36 forward relative to the seat 22, such as via automatic linear actuation when commanded, such as by an input from the passenger through a passenger control unit. In the embodiment in which the housing 36 slides, the housing 36 may slide forward a first portion of the way and the tray table 34 the remaining portion. Once the supporting carriage assembly 44 has traveled horizontally forward along the rail an amount sufficient to clear any underlying obstruction, as described below, the tray table 34 is able to deploy horizontally.

Figure 5:
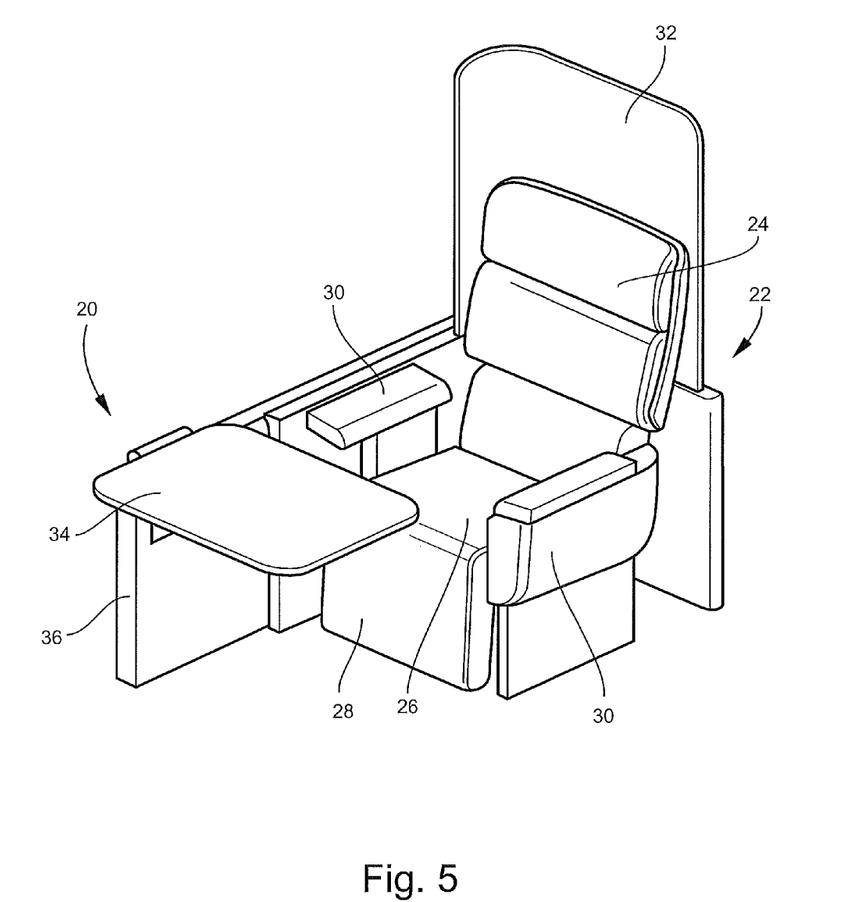
FIG. 5 shows the tray table deployed horizontally and moved horizontally forward apart from the seat.
Figure 6:
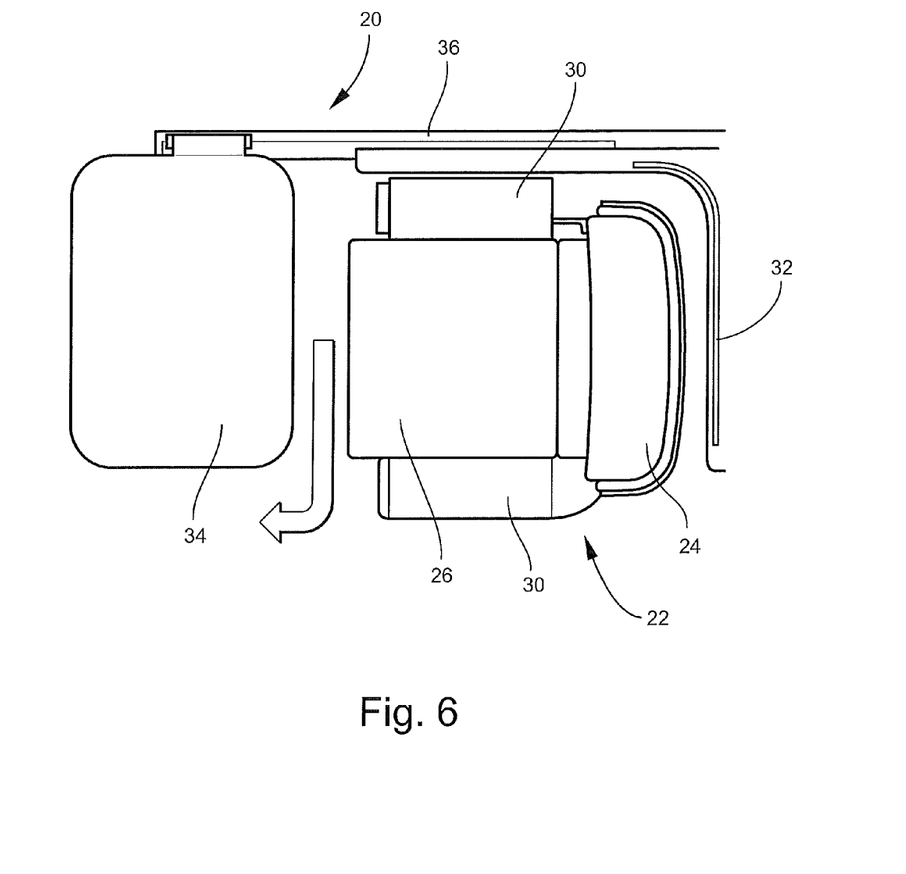
FIG. 6 is an overhead view showing the tray table moved horizontally forward apart from the seat to permit egress from the seat.

Referring to FIGS. 5 and 6, once the tray table 34 is deployed, the carriage assembly 44 is able to travel horizontally a predetermined distance to position the tray table 34 apart from the seat to permit egress from the seat without having to stow the tray table.

Figure 7:
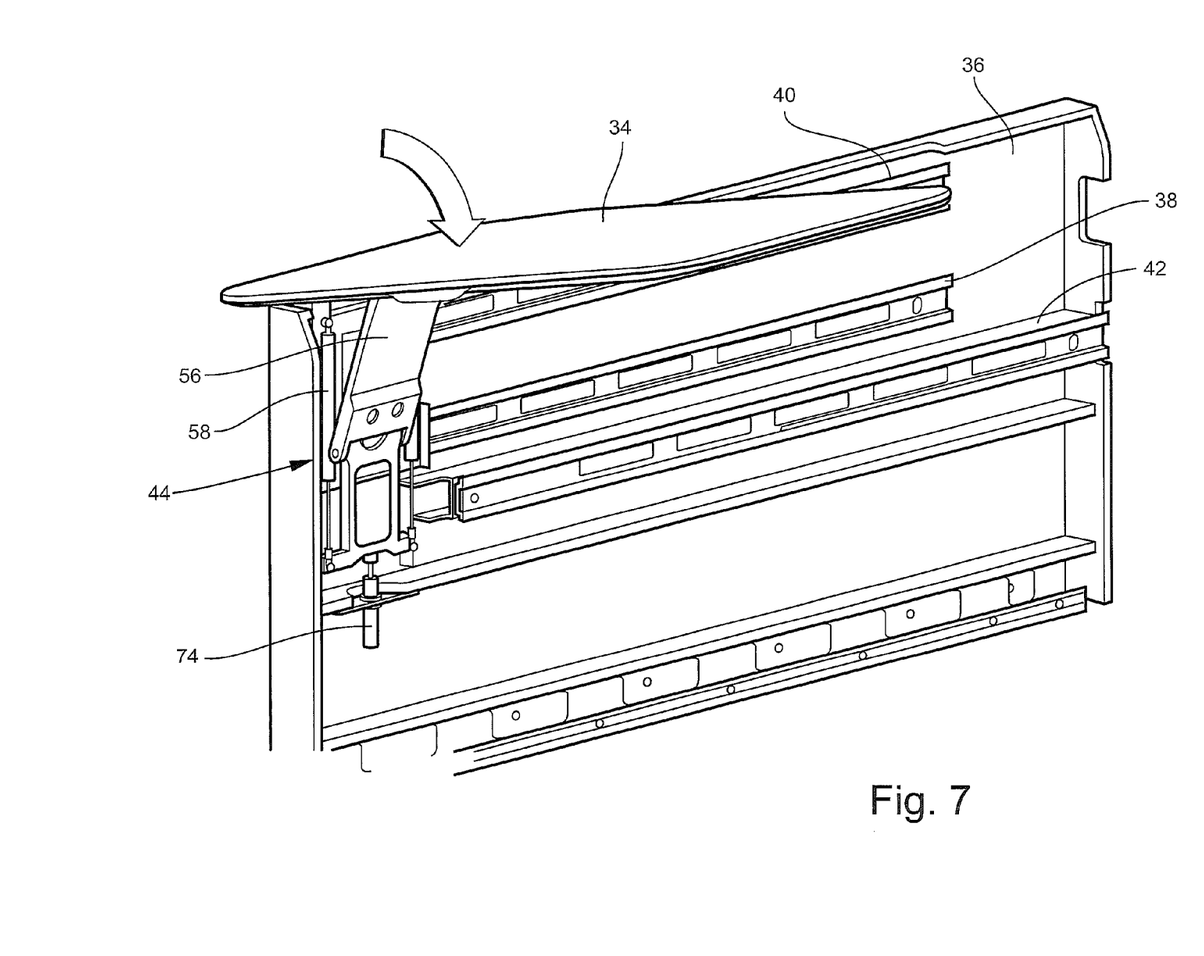
FIG. 7 is an isometric view of the horizontal rail arrangement upon which the tray table slides alongside the seat.

Referring to FIG. 7, the housing 36 houses a first horizontal rail 38, a second horizontal rail 40, and a ledge 42. The first and second rails 38, 40 are arranged parallel to one another and each have a length that extends from the seatback 24 to a position forward of the seat 22. The spaced rail arrangement may be provided to prevent the tray table from twisting, and the rails may be continuous such that the carriage assembly travels along both simultaneously. The length of the rails may be customized depending on the desired length of travel and amount of available space forward of the seat 22.

The ledge 42 is arranged parallel to and vertically below the first horizontal rail 38. The ledge 42 is continuous along a portion of the length of the first horizontal rail 38 from the seatback 24 forward, but stops short of extending to the forward end of the first horizontal rail 38. In this arrangement, the ledge 42 functions to interfere with the carriage assembly 44 along the coextensive portions of the first horizontal rail 38 and ledge 42 to prevent the carriage assembly 44 from lowering vertically to deploy the tray table 34 horizontally. Once the carriage assembly 44 travels forward beyond the ledge 42, the carriage assembly 44 is free to lower to rotate the tray table toward horizontal. This arrangement is advantageous because the ledge 42 prevents the tray table 34 from deploying toward horizontal too early and falling on the seated passenger.

Figure 8:
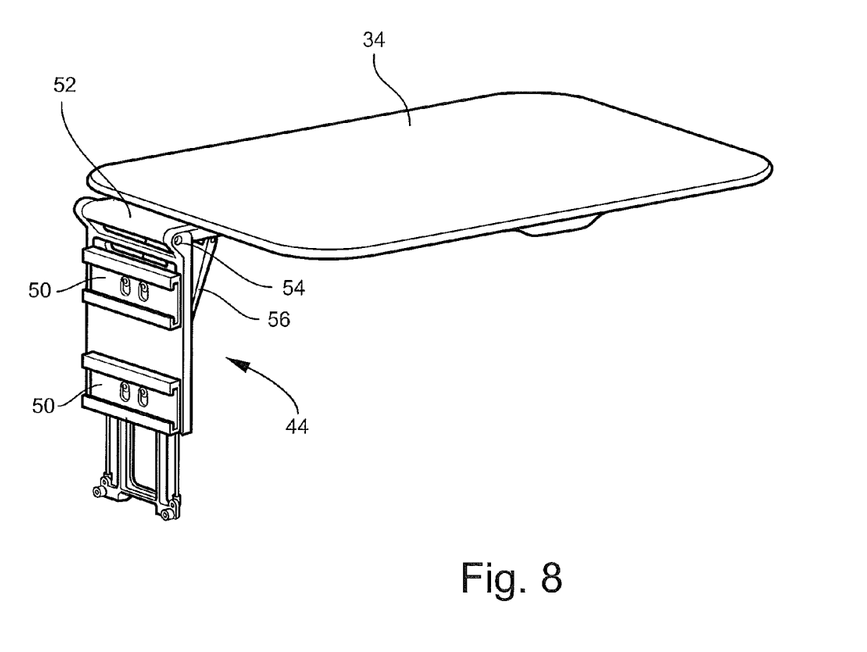
FIG. 8 is an isometric view of the tray table and carriage assembly.
Figure 9:
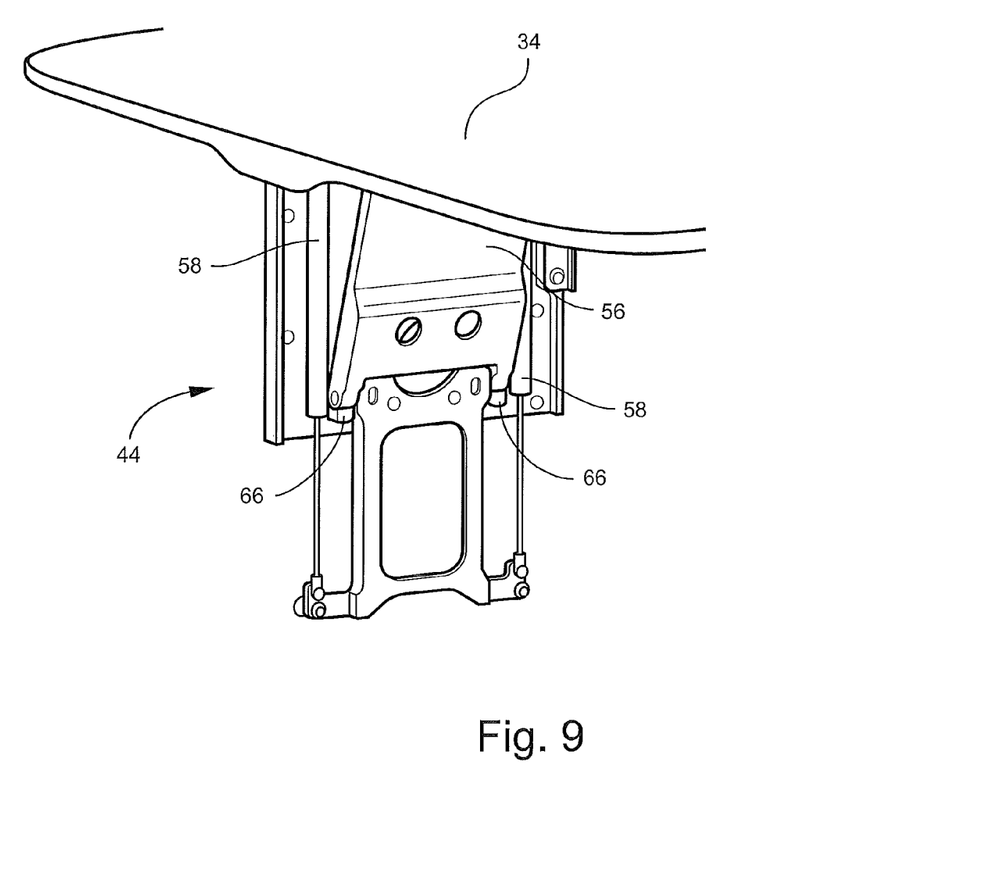
FIG. 9 is a detailed view of the tray table and carriage assembly of FIG. 8.
Figure 10:
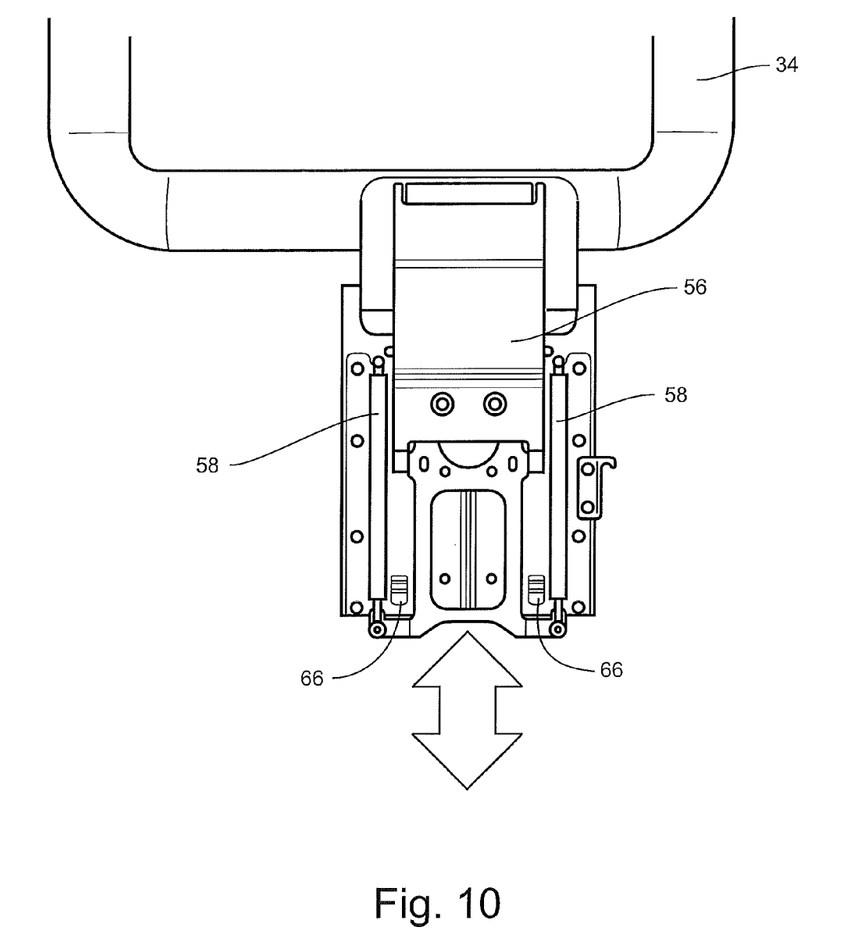
FIG. 10 details carriage and tray table movement.

Referring to FIGS. 8-10, the tray table 34 is supported and carried by the carriage 44. The carriage assembly may include a first portion and a second portion that align vertically beyond the ledge 42 to allow the tray table 34 to deploy horizontally. The carriage assembly 44 travels horizontally along the length of at least the first horizontal rail 38. Guide blocks 50 on the backside of the carriage assembly 44 engage with and travel horizontally along their respective rail. Sliding movement of the guide blocks 50 along the rails 38, 40, as well as sliding movement of the housing 36 relative to the floor, may be achieved using any form of linear slide for guiding motion in at least one dimension, which may include, for example, a linear-motion bearing, a rolling element bearing, a roller slide, a plain bearing, a roller, etc.

The tray table 34 attaches on its underside to a support member 52. The support member 52 is pivotally attached at one end to the carriage assembly 44 and pivots about pivot point 54 to move the tray table between the vertical and horizontal positions. A support beam 56 supports the tray table 34 in its horizontal, cantilevered position. The support beam 56 is pivotally attached to the carriage assembly 44 at a first end and to the support member 52 at a second end. The support beam 56 further slides vertically relative to the carriage assembly 44 such that as the tray table moves in the direction toward horizontal, the first end of the support beam 56 moves vertically downward with respect to the carriage assembly 44 and the second end of the support beam 56 moves outward with respect to the carriage assembly 44. When the tray table 34 is horizontal, the support beam 56 is at angle to vertical to brace the tray table from below. Referring to FIG. 10, traction gas springs 58 provide a spring force in the direction indicated by arrows 60 to facilitate lifting the tray table for stowing. The support beam 56 may rest on stops 66 when the tray table 34 is fully deployed, which takes the gas springs 58 out of the load path. Deployment motion may be controlled by a motorized linear actuator, in which case the gas springs are not necessary.

Figures 11A, 11B, 11C:
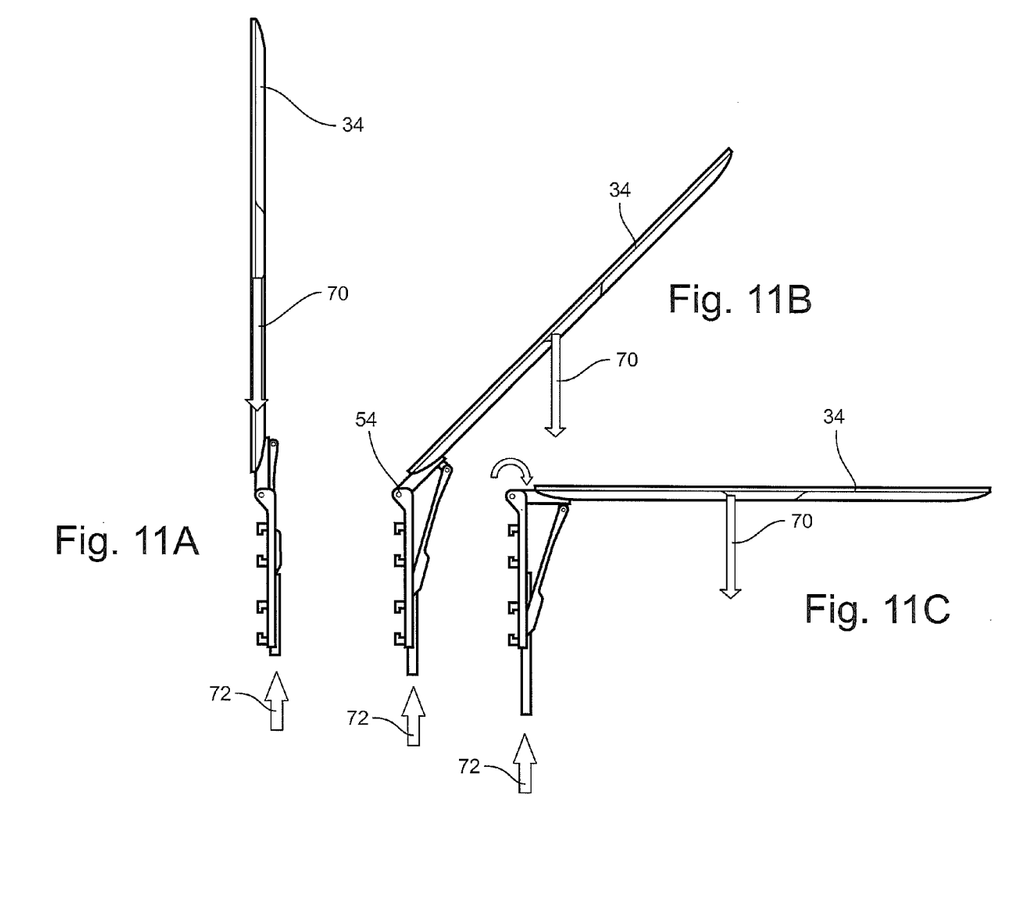
FIGS. 11A-C are sequential views illustrating tray table deployment from a vertical orientation to a horizontal orientation.

Referring to FIGS. 11A-C, the gas springs may be sized such that the gas spring forces cancel out the force from the tray table's center of gravity when the tray table 34 is at approximately 45 degrees. This creates a tipping point above which the tray table 34 wants to rotate toward the stowed vertical position and below which the tray table wants to rotate to the deployed horizontal position. As shown in FIG. 11A, in the stowed position, the force from the tray table's center of gravity is vertically downward as indicated by directional arrow 70, and the force from the gas spring is vertically upward as indicated by directional arrow 72. The moment generated by the tray table's center of gravity is weaker than the moment generated by the force from the gas springs above about 45 degrees, thus the tray table 34 wants to rotate toward the stowed position. As shown in FIG. 11B, these forces 70, 72 cancel each other out at about 45 degrees such that no tray table rotational moment is created at the pivot point 54. As shown in FIG. 15C, the moment generated by the tray table's center of gravity overwhelms the gas springs below about 45 degrees, and the tray table 34 rotates toward the deployed horizontal position.

As best shown in FIG. 7, tray table rotation during deployment may be controlled by a linear speed control damper and/or brought to a controlled stop with a shock absorber, such as a hydraulic shock absorber 74 as shown.

The tray table 34 may be grabbed and manipulated to move and deploy it. Pivoting range of motion of the tray table 34 may be about 90 degrees, for example. The assembly 20 may further includes a release mechanism, latch, lock or automated assistance for moving, stowing, releasing and locking the tray table in either the deployed or stowed positions.

While preferred embodiments of a vertically stowed and translating tray table assembly are described above, it is apparent that various details of the invention may be changed without departing from the scope of the invention. Furthermore, the foregoing description of the embodiments of the invention and the best mode for practicing the invention are provided for the purpose of illustration only and not for the purpose of limitation.

What is claimed is:

1. A tray table assembly for a passenger seat including a seatback and a seat bottom, comprising:
   a horizontal rail arranged alongside the passenger seat, the horizontal rail having a length extending from the seatback to a position forward of the seat;
   a carriage assembly configured to travel horizontally along the length of the horizontal rail;
   a tray table attached to the carriage assembly, the tray table configured to pivot between a vertical orientation in which the tray table is stowed alongside the seatback and a horizontal orientation in which the tray table is positioned forward of the seatback; and
   a ledge arranged parallel to and vertically below the horizontal rail, the ledge continuous along a portion of the length of the horizontal rail, the ledge interfering with the carriage assembly along coextensive portions of the horizontal rail and the ledge to prevent the carriage assembly from lowering vertically to deploy the tray table horizontally.

2. The tray table assembly of claim 1, further comprising a second horizontal rail arranged parallel to and continuous with the horizontal rail, the carriage assembly spanning between the horizontal rail and the second horizontal rail such that the carriage assembly travels horizontally along both rails.

3. The tray table assembly of claim 1, further comprising a housing within which the horizontal rail and the ledge are housed.

4. The tray table assembly of claim 1, further comprising a support member and a support beam, the support member pivotally attached to the carriage assembly and the support beam, the support beam supporting the tray table in a horizontal cantilevered orientation, and the support beam slidably and pivotally attached at one end to the carriage assembly such that as the tray table pivots toward horizontal the support beam lowers vertically relative to the carriage assembly and pivots to an angle to vertical.

5. The tray table assembly of claim 1, wherein the carriage assembly includes a gas spring arranged to provide a spring force for lifting the tray table for stowing.

6. The tray table assembly of claim 5, wherein the gas spring is sized such that a spring force cancels out force from the tray table's center of gravity when the tray table is at 45 degrees to horizontal.

7. The tray table assembly of claim 1, further comprising a damper arranged to control tray table rotation during deployment.

8. An aircraft passenger seat, comprising:
a seat including a seat bottom and a seatback; and
a tray table assembly arranged alongside the seat, the tray table assembly comprising a horizontal rail arranged alongside the passenger seat and having a length extending from the seatback to a position forward of the seat, a carriage assembly configured to travel horizontally along the length of the horizontal rail, a tray table pivotally attached to the carriage assembly configured to pivot between a vertical orientation in which the tray table is stowed alongside the seatback and a horizontal orientation in which the tray table is positioned forward of the seatback, and a support member and a support beam, the support member pivotally attached to the carriage assembly and the support beam, the support beam supporting the tray table in a horizontal cantilevered orientation, and the support beam slidably and pivotally attached at one end to the carriage assembly such that as the tray table pivots toward horizontal the support beam lowers vertically relative to the carriage and pivots to an angle to vertical.

9. The aircraft passenger seat of claim 8, further comprising a second horizontal rail arranged parallel to and continuous with the first horizontal rail, the carriage assembly spanning between the horizontal rail and the second horizontal rail such that the carriage assembly travels horizontally along both rails.

10. The aircraft passenger seat of claim 8, further comprising a ledge arranged parallel to and vertically below the horizontal rail, the ledge continuous along a portion of the length of the horizontal rail, the ledge interfering with the carriage assembly along coextensive portions of the horizontal rail and the ledge to prevent the carriage assembly from lowering vertically to deploy the tray table horizontally.

11. The aircraft passenger seat of claim 10, further comprising a housing positioned alongside the seat within which the horizontal rail and the ledge are housed.

12. The tray table assembly of claim 1, further comprising a gas spring arranged to provide a spring force for lifting the tray table for stowing, and a damper arranged to control tray table rotation during deployment.

* * * * *